United States Patent
Petri

(10) Patent No.: US 8,244,694 B2
(45) Date of Patent: Aug. 14, 2012

(54) DYNAMIC SCHEMA ASSEMBLY TO ACCOMMODATE APPLICATION-SPECIFIC METADATA

(75) Inventor: John E. Petri, Lewiston, MN (US)

(73) Assignee: International Business Machines Corporation, Armonk, NY (US)

( * ) Notice: Subject to any disclaimer, the term of this patent is extended or adjusted under 35 U.S.C. 154(b) by 119 days.

(21) Appl. No.: 11/531,096

(22) Filed: Sep. 12, 2006

(65) Prior Publication Data

US 2008/0065678 A1    Mar. 13, 2008

(51) Int. Cl.
    *G06F 17/00* (2006.01)
(52) U.S. Cl. .......................................... 707/694
(58) Field of Classification Search ................... 707/694
    See application file for complete search history.

(56) References Cited

U.S. PATENT DOCUMENTS

| | | | | |
|---|---|---|---|---|
| 5,050,071 | A * | 9/1991 | Harris et al. | 707/1 |
| 6,418,448 | B1 * | 7/2002 | Sarkar | 707/104.1 |
| 6,574,609 | B1 * | 6/2003 | Downs et al. | 705/50 |
| 6,732,331 | B1 * | 5/2004 | Alexander | 715/234 |
| 6,782,394 | B1 * | 8/2004 | Landeck et al. | 707/104.1 |
| 6,904,454 | B2 * | 6/2005 | Stickler | 709/213 |
| 7,062,502 | B1 * | 6/2006 | Kesler | 707/102 |
| 7,072,983 | B1 * | 7/2006 | Kanai et al. | 709/246 |
| 7,281,018 | B1 * | 10/2007 | Begun et al. | 1/1 |
| 7,325,193 | B2 * | 1/2008 | Edd et al. | 715/255 |
| 7,483,895 | B2 * | 1/2009 | Hysom et al. | 1/1 |
| 2002/0049961 | A1 * | 4/2002 | Fang et al. | 717/127 |
| 2002/0083324 | A1 * | 6/2002 | Hirai | 713/176 |
| 2002/0099710 | A1 * | 7/2002 | Papierniak | 707/100 |
| 2002/0133491 | A1 * | 9/2002 | Sim et al. | 707/10 |
| 2002/0136428 | A1 * | 9/2002 | Sugahara et al. | 382/100 |
| 2002/0184255 | A1 * | 12/2002 | Edd et al. | 707/500 |
| 2002/0188841 | A1 * | 12/2002 | Jones et al. | 713/153 |
| 2002/0194194 | A1 * | 12/2002 | Fenton et al. | 707/104.1 |
| 2003/0018622 | A1 * | 1/2003 | Chau | 707/3 |
| 2003/0028563 | A1 * | 2/2003 | Stutz et al. | 707/513 |
| 2003/0115189 | A1 * | 6/2003 | Srinivasa et al. | 707/3 |
| 2003/0120667 | A1 * | 6/2003 | Jeong et al. | 707/100 |
| 2003/0154071 | A1 * | 8/2003 | Shreve | 704/9 |
| 2003/0222906 | A1 * | 12/2003 | Fish et al. | 345/744 |
| 2004/0024720 | A1 * | 2/2004 | Fairweather | 706/46 |
| 2004/0093323 | A1 * | 5/2004 | Bluhm et al. | 707/3 |
| 2004/0153968 | A1 * | 8/2004 | Ching et al. | 715/513 |
| 2004/0199867 | A1 * | 10/2004 | Brandenborg | 715/500.1 |
| 2004/0205528 | A1 * | 10/2004 | Alexander | 715/505 |
| 2004/0205573 | A1 * | 10/2004 | Carlson et al. | 715/513 |
| 2005/0138110 | A1 * | 6/2005 | Redlich et al. | 709/201 |
| 2005/0198393 | A1 * | 9/2005 | Stutz et al. | 709/246 |
| 2005/0234907 | A1 * | 10/2005 | Yamagishi et al. | 707/5 |
| 2005/0240393 | A1 * | 10/2005 | Glosson | 704/8 |
| 2005/0268219 | A1 * | 12/2005 | Roma i Dalfo | 715/512 |
| 2006/0106843 | A1 * | 5/2006 | Middelfart et al. | 707/101 |

(Continued)

*Primary Examiner* — Charles Kim
*Assistant Examiner* — Kurt Mueller
(74) *Attorney, Agent, or Firm* — Patterson & Sheridan, LLP; Grant A. Johnson

(57) ABSTRACT

Embodiments of the invention provide a method, system, and article of manufacture for the dynamic schema assembly for documents managed by a content management system (CMS). In one embodiment, a transient, application specific markup schema is dynamically generated when a user accesses a data object managed by the CMS. For example, users may perform operations such as checking out a document from the CMS, viewing a document in the CMS or exporting a document from the CMS. The transient schema is configured to accommodate application-specific metadata, without directly changing or interfering with a base schema associated with the data object.

19 Claims, 5 Drawing Sheets

U.S. PATENT DOCUMENTS

| | | | |
|---|---|---|---|
| 2006/0156219 A1* | 7/2006 | Haot et al. | 715/500.1 |
| 2006/0239501 A1* | 10/2006 | Petrovic et al. | 382/100 |
| 2006/0294077 A1* | 12/2006 | Bluhm et al. | 707/3 |
| 2007/0203927 A1* | 8/2007 | Cave et al. | 707/101 |
| 2007/0214185 A1* | 9/2007 | Fujiwara | 707/200 |
| 2008/0005138 A1* | 1/2008 | Gauthier et al. | 707/101 |
| 2008/0005139 A1* | 1/2008 | Hysom et al. | 707/101 |
| 2009/0077129 A1* | 3/2009 | Blose | 707/104.1 |

* cited by examiner

DYNAMIC SCHEMA ASSEMBLY TO ACCOMMODATE APPLICATION-SPECIFIC METADATA

BACKGROUND OF THE INVENTION

1. Field of the Invention

Embodiments of the invention are generally related to storing information in a content management system. More specifically, embodiments of the invention are generally related to a method and system for dynamic schema assembly to accommodate application-specific metadata.

2. Description of the Related Art

Content management systems (CMS) allow multiple users to share information. Generally, a CMS system allows users to create, modify, archive, search, and remove data objects from an organized repository. The data objects managed by CMS may include documents, spreadsheets, database records, digital images and digital video sequences, to name but a few. A CMS typically includes tools for document publishing, format management, revision and/or access control, along with tools for document indexing, searching, and retrieval.

An XML-aware CMS such as the IBM® Solution for Compliance in a Regulated Environment (S.C.O.R.E.) can provide sophisticated XML data management capabilities. For example, by using XML content rules the following techniques can be used to bind XML content with other objects stored in the CMS repository:

Bursting: Bursting is the process of breaking apart an XML document into smaller chunks or fragments, where each chunk can be managed as its own object in the CMS data repository (e.g., each object can have its own access control rules, version lifecycles, etc.). When the user edits an XML file that has been burst, the CMS assembles the various chunks so that the XML document appears to be a single unit again. This feature is very useful for sharing and reusing XML content during authoring.

Linking: Linking is the association of an object in the CMS with a particular element or attribute from the XML document. For example, an XHTML document might contain <img> tags which reference JPG images. When the XML document is imported into the repository, the CMS can automatically process all of the <img> tags in the document and bind them to images stored in the repository.

To properly describe the chunks of a burst document or the links to external objects, current art requires that a DTD or schema associated with a document to be changed to allow for extra attributes or elements to be inserted by the CMS.

One drawback to this approach, however, is that the DTDs and XML schemas associated with documents managed by the CMS are commonly owned by the users and changing them is not always possible. For example, a standardized schema may be provided by third parties and it may be desirable to change the schema to suit the particular needs of a given user. Even when it is possible to change such a schema, it often has to be performed up-front with minimal changes so that the user's DTD's and/or schemas are minimally affected. Alternatively, users can create a replica of the schema that is used exclusively for describing user or application specific metadata data; but the approach of managing two closely related schemas that are differentiated by context introduces problematic maintenance issues; namely, it becomes very difficult to simultaneously maintain both the "official version" and the "side version" created to allow document bursting by the CMS. Neither of these approaches provides an adequate solution to the problem of including application specific metadata in a standardized or legacy schema and/or DTD Accordingly there remains a need for techniques to accommodate application specific metadata associated with a document managed by a content management system.

SUMMARY OF THE INVENTION

Embodiments of the invention provide a method, system, and article of manufacture for the dynamic assembly of schemas and/or DTD associated with documents managed by a content management system (CMS).

Embodiments of the invention include a method for providing dynamic schema assembly to accommodate application specific metadata in data objects managed by a CMS. The method generally includes receiving a request to access a document from the CMS, wherein the document is associated with a base schema. And in response to the request, generating a modified document by embedding the application specific metadata in the document and generating a transient schema by rewriting an instance of the base schema associated with the document. The modified document may be validated against the transient schema. Once generated, the method also includes providing the modified document and transient schema to a requesting application in response to the request. In a particular embodiment, the document and modified document are marked up using the XML markup language and the base schema is an XML schema or document type definition (DTD).

The method may still further include receiving the modified document from the requesting application, stripping the application specific metadata from the modified document, wherein the modified, stripped document may be validated against the base schema and storing the modified, stripped document in the CMS.

Embodiments of the invention also include a computer-readable storage medium containing a program which, when executed, performs an operation for providing dynamic schema assembly to accommodate application specific metadata in data objects managed by a CMS. The operation generally includes receiving a request to access a document from the CMS, wherein the document is associated with a base schema. In response to the request, the operation may further include generating a modified document by embedding the application specific metadata in the document and generating a transient schema by rewriting an instance of the base schema associated with the document. The modified document may be validated against the transient schema. Once generated the modified document and transient schema may be provided to a requesting application in response to the request.

Embodiments of the invention also include a system having a processor and a memory containing a content management system (CMS) configured to perform a method for providing dynamic schema assembly to accommodate application specific metadata in data objects managed by a content management system. The method performed by the system may generally include receiving a request to access a document from the CMS, wherein the document is associated with a base schema. In response to the request, the method performed by the system includes generating a modified document by embedding the application specific metadata in the document and generating a transient schema by rewriting an instance of the base schema associated with the document, wherein the modified document may be validated against the transient schema. Once generated, the system may be configured to provide the modified document and transient schema to a requesting application in response to the request.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

Note, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Figure 1:
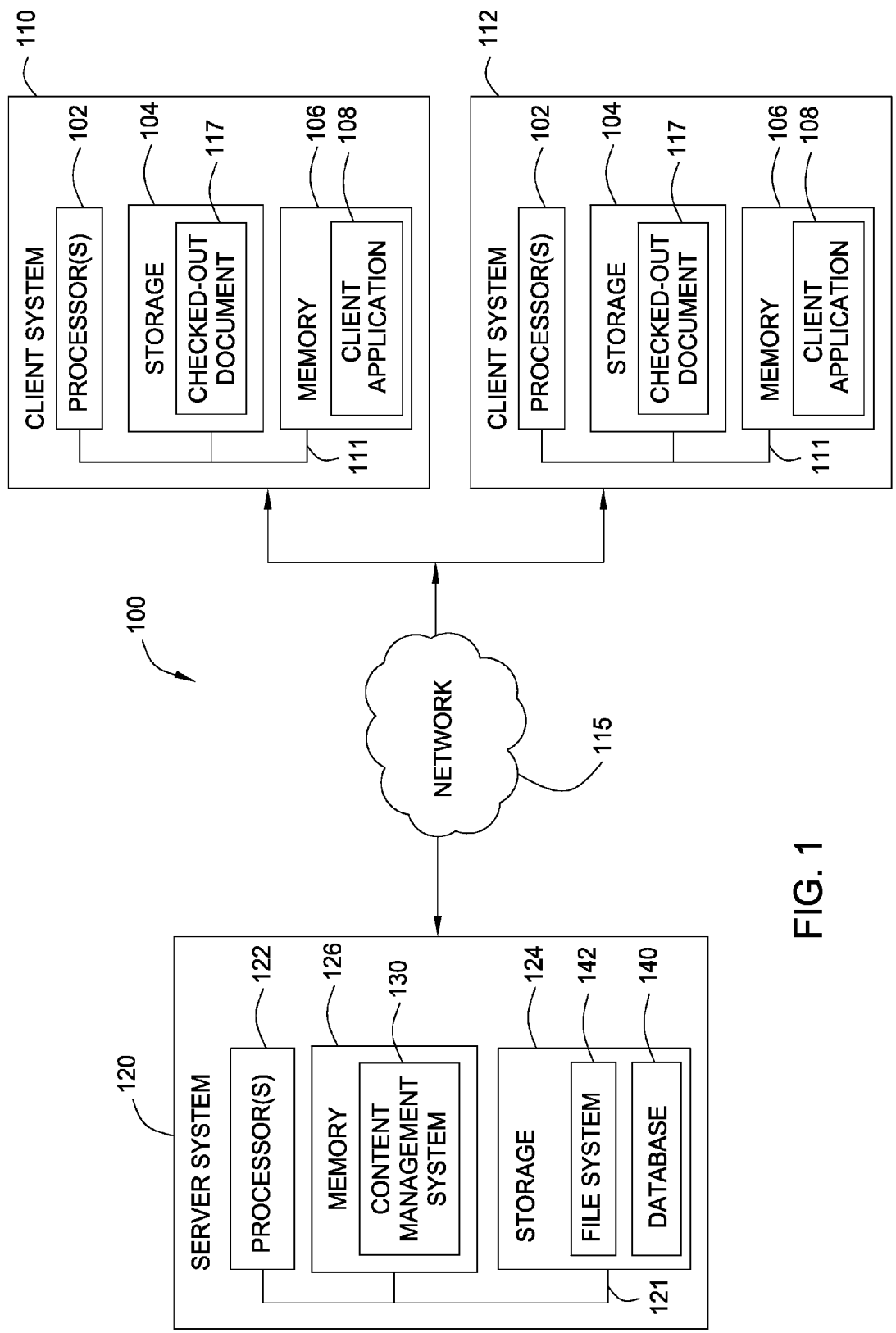
FIG. 1 is a block diagram illustrating a computing environment and CMS, according to one embodiment of the invention.

Embodiments of the invention provide a method, system, and article of manufacture for the dynamic schema assembly for documents managed by a content management system (CMS). In one embodiment, a transient, application specific markup schema is dynamically generated when a user accesses a data object managed by the CMS. For example, users may perform operations such as checking out a document from the CMS, viewing a document in the CMS or exporting a document from the CMS. The transient schema is configured to accommodate application-specific metadata, without permanently changing or interfering with a base schema associated with the data object.

This approach allows a customer's DTD or schema to be dynamically rewritten to allow for the application-specific metadata to be inserted into a document, without sacrificing the ability to validate the document against the modified schema. Further, this approach allows for the efficient inclusion of application-specific metadata within the content itself, while isolating the inclusion of the application specific metadata as a transient step. When a document is checked back into the CMS, the application specific metadata may be stripped from the document.

Embodiments of the invention are described herein adapted for use with the widely used XML markup language. Accordingly, references to data objects, documents, and XML documents generally refers to data marked up using a well-formed collection of XML tags, elements and/or attributes. As is known, an XML document may be used to describe virtually any type of data. For example, XML grammars have been used to describe word processing documents, spreadsheets, database records, digital images and digital video, to name but a few. Further, specialized grammars are frequently specified by a domain specific XML schema. The XML schema may be used to describe domain-specific data objects, such as rules regarding the structure, content, attributes, or semantics of a particular document type. However, the invention is not limited to the XML markup language, XML schemas, and the use of XML documents; rather, embodiments of the invention may be adapted to other markup languages or other data object formats or data representations, whether now known or later developed.

Further, the following description references embodiments of the invention. However, it should be understood that the invention is not limited to any specifically described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable media. Illustrative computer-readable media include, but are not limited to: (i) non-writable storage media on which information is permanently stored (e.g., read-only memory devices within a computer such as CD-ROM or DVD-ROM disks readable by a CD- or DVD-ROM drive); (ii) writable storage media on which alterable information is stored (e.g., floppy disks within a diskette drive, hard-disk drives, or flash memory devices). Other media include communications media through which information is conveyed to a computer, such as through a computer or telephone network, including wireless communications networks. The latter embodiment specifically includes transmitting information to/from the Internet and other networks. Such computer-readable media, when carrying computer-readable instructions that direct the functions of the present invention, represent embodiments of the present invention.

Embodiments of the present invention may also be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. Aspects of these embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

FIG. 1 is a block diagram that illustrates a client/server view of a computing environment 100, according to one embodiment of the invention. As shown, computing environment 100 includes two client computer systems 110 and 112 communicating with a server system 120 over a network 115. The computer systems 110, 112, and 120 illustrated in environment 100 are included to be representative of existing computer systems, e.g., desktop computers, server computers, laptop computers, tablet computers and the like. However, embodiments of the invention are not limited to any particular computing system, application, device, or network architecture and instead, may be adapted to take advantage of new computing systems and platforms as they become available. Additionally, those skilled in the art will recognize that the illustration of computer systems 110, 112, and 120 are simplified to highlight aspects of the present invention and that computing systems and networks typically include a variety of additional elements not shown in FIG. 1.

As shown, client computer systems 110 and 112 each include a CPU 102, storage 104, and memory 106 connected by a bus 111. CPU 102 is a programmable logic device that performs all the instructions, logic and mathematical processing performed in executing user applications (e.g., a client application 108. Storage 104 stores application programs and data for use by client computer systems 110 and 112. Typical storage devices 104 include hard-disk drives, flash memory devices, optical media and the like. Additionally, the processing activity and access to hardware resources made by client application 108 may be coordinated by an operating system (not shown). Well known examples of operating systems include the Windows® operating system, distributions of the Linux® operating system, among others. (Linux is a trademark of Linus Torvalds in the US, other countries, or both). Network 115 represents any kind of data communications network, including both wired and wireless networks. Accordingly, network 115 is representative of both local and wide area networks, including the Internet.

Illustratively, memory 106 of client computer systems 110 and 112 includes a client application 108. In one embodiment, client application 108 is a software application that allows end users to retrieve and edit data objects stored in a content management system (CMS) 130. Thus, client application 108 may be configured to allow users to create, edit, and save a data object, e.g., word-processing documents, spreadsheets, database records, digital images or video data objects, to name but a few (collectively referred to herein as a "documents"). In one embodiment, client application 108 may be configured to receive a document 117 from CMS 130 and store it in storage 104 while it is being accessed by client application 108.

Documents accessed from CMS 130 may be marked up using XML elements to describe the underlying data contained within the document for use with a particular client application 108, relative to an associated XML schema. Additionally, CMS 130 may be configured to embed application specific markup content or metadata when a document is checked out from the CMS 130 and to modify an XML schema or DTD associated with the document to accommodate the application specific metadata.

To give an example from the pharmaceutical industry, the International Conference on Harmonization of Technical Requirements (ICH) has published an XML grammar for XML documents governing electronic drug submissions to the FDA known as the eCTD—electronic common technical document. The eCTD includes a standardized set of XML schemas used to validate whether a given document conforms to the standards specified for the eCTD. At the same time, when a user accesses a document from the CMS 130, additional application specific metadata may be used by client application 108 or CMS 130. For example, different components of an eCTD document may be stored by the CMS 130 as "burst" or "chunked" components, and application specific metadata may specify the boundaries for a given chunk, as well as specify read/write restrictions for each chunk that should be observed by client application 108. Additionally, one document may include links to other documents, (e.g., links to images).

While this functionality is clearly useful for managing content shared among a group of users, adding these additional attributes "breaks" the document, relative to an associated XML schema (e.g., the eCTD schema). To resolve this problem, in one embodiment, CMS 130 may dynamically rewrite a given schema (e.g., one of the eCTD XML schemas) to allow the application specific metadata to be included in the document when it is checked out or accessed by client application 108. Thus, while being accessed by client application 108, the document may include the additional metadata and/or content and still be validated, relative to the modified schema. Additionally, features such as fragment boundaries, read/write restrictions, and the like, may be enforced by the client application 108. Further, when the document is checked back into the CMS, the application specific metadata may be stripped out, allowing the document to again be validated against the original schema (e.g., the eCTD schema).

Server system 120 also includes a CPU 122, storage 124, and a memory 126 connected by a bus 121. Storage 124 includes a database 140 and file system 142. File system 142 typically provides access to a directory structure contained on a disk drive or network file system and may be used to store files (e.g., documents managed by CMS 130). Database 140 may contain additional information and metadata related to documents stored in file system 142. Memory 126 of server system 120 includes CMS 130. As stated, CMS 130 may provide an application program configured for creating, modifying, arching and removing content managed by CMS 130. Typically, CMS 130 may include tools used for publishing, format management, revision and/or access control, content indexing, and facilities for performing searches and other operations related to documents managed by CMS 130.

Figure 2:
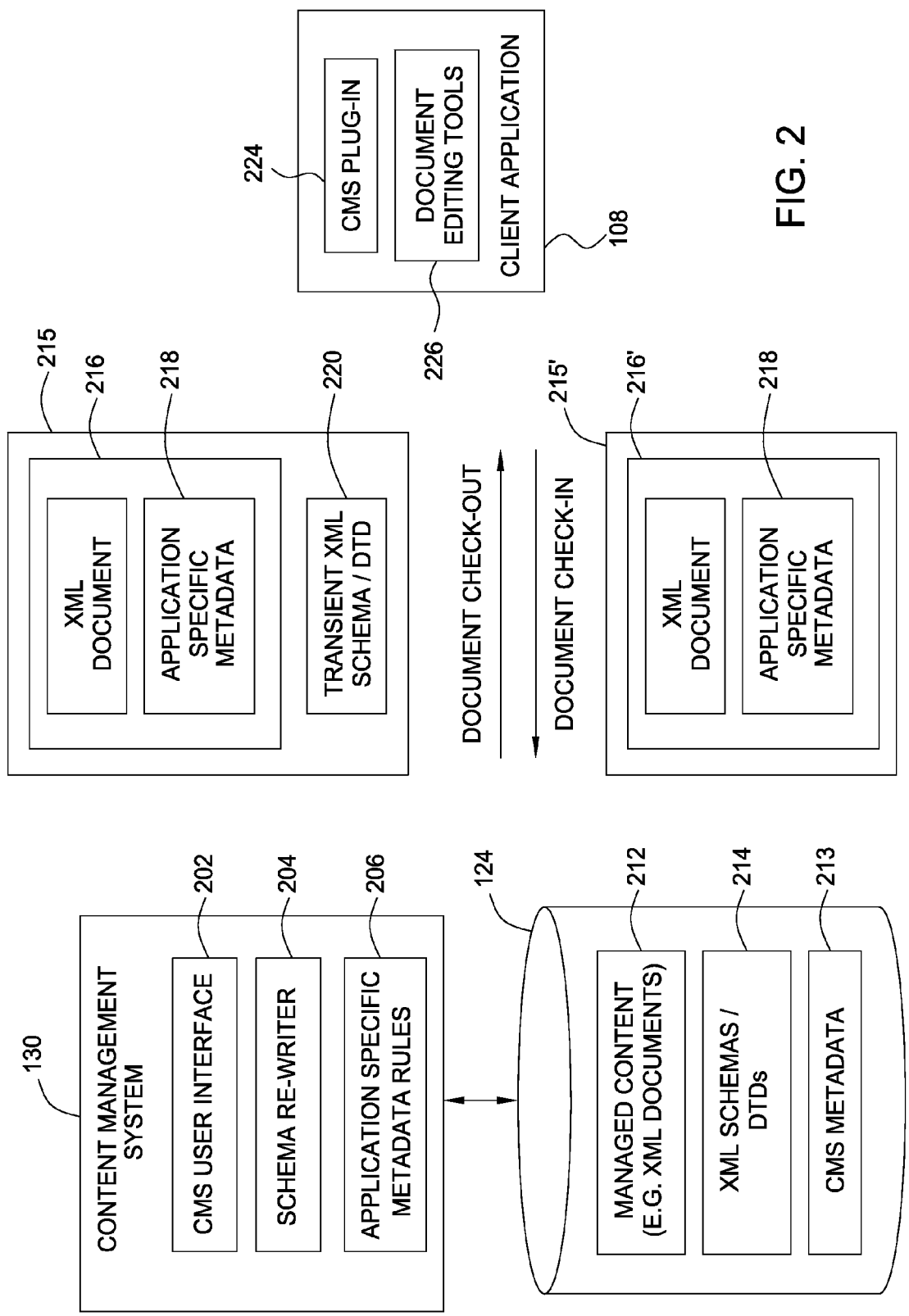
FIG. 2 is a block diagram further illustrating of a document accessed from a CMS by a client application, according to one embodiment of the invention.

FIG. 2 is a block diagram illustrating components of a client application 108 used to access a document package 215 managed by CMS 130, according to one embodiment of the invention. As shown, CMS 130 includes a user interface 202, schema rewriter 204, and application specific metadata rules 206. Generally, user interface 202 provides an interface to the functions provided by CMS 130 and content stored by database 140 and file system 142. Thus, user interface 202 may provide mechanisms for checking in/out a document from CMS 130, for specifying metadata rules 206, for creating, viewing, and exporting documents from CMS 130 etc.

Schema rewriter 204 may be configured to modify a base schema associated with a document to accommodate application specific metadata inserted into a document by CMS 130. The application specific metadata may enable functions or features provided by CMS 130 (e.g., document bursting and linking for compound documents) or client application 108 (e.g., enforcing read/write restrictions for a given document). The content managed by CMS 130 may be in storage 124. Illustratively, storage 124 includes managed content 212 (e.g., a collection of XML documents), XML schemas/DTDs 214 and CMS metadata 213.

XML schema/DTDs 214 provide a description of the allowed content and structure of a given type of XML document. More specifically, schemas/DTDs 214 provide rules specifying which elements (e.g., the markup tags) and attributes (i.e., values associated with specific tags) are allowed in a particular XML document. Metadata rules 206 may specify which elements from a base DTD or schema are affected by the application specific metadata associated with a given application along with re-writing rules used by schema rewriter 204 to modify the base DTD or schema to accommodate a particular set of application specific metadata.

Illustratively, client application 108 includes CMS plug-in 224 and data viewing and editing tools 226. Editing tools 226 provide the substantive features associated with a particular client application 108. For example, a word processing application may provide tools for specifying document presentation style or a CAD application may include tools for creating precise thee-dimensional digital models of real-world objects. Of course, depending on the function of client application 108, the exact features provided by viewing/editing tools 226 will vary. CMS plug-in 224 allows client application 108 to interact with CMS 130. For example, plug-in 224 may allows a user interacting with client application 108 to check-in, check-out, view, export, create, documents managed by CMS 130.

As shown, checkout package 215 includes an XML document 216 application specific metadata 218, and a transient XML Schema/DTD 220 used to validate XML document 216. The package 215 is delivered to client application 108 where a user may edit the content of the document using editing tools 226. The XML document 216 includes application specific metadata 218, and the transient XML schema/DTD 220 recognizes the application specific metadata 218 as being valid constructs for XML document 216. Check-in package 215' shows a document 216' being returned to the CMS 130 after a user has completed editing, viewing, or otherwise accessing document 216. Illustratively, the check-in package 215' includes the XML document 216' with the application specific metadata 218. In one embodiment, when check-in package 215' is returned to CMS 130, the application specific metadata may be stripped out of the XML document 216'. Note also, transient XML schema/DTD 220 need not be included in check-in package 215', as this schema was generated to accommodate the application specific metadata 218 while the document was being accessed by application 108.

Figure 3:
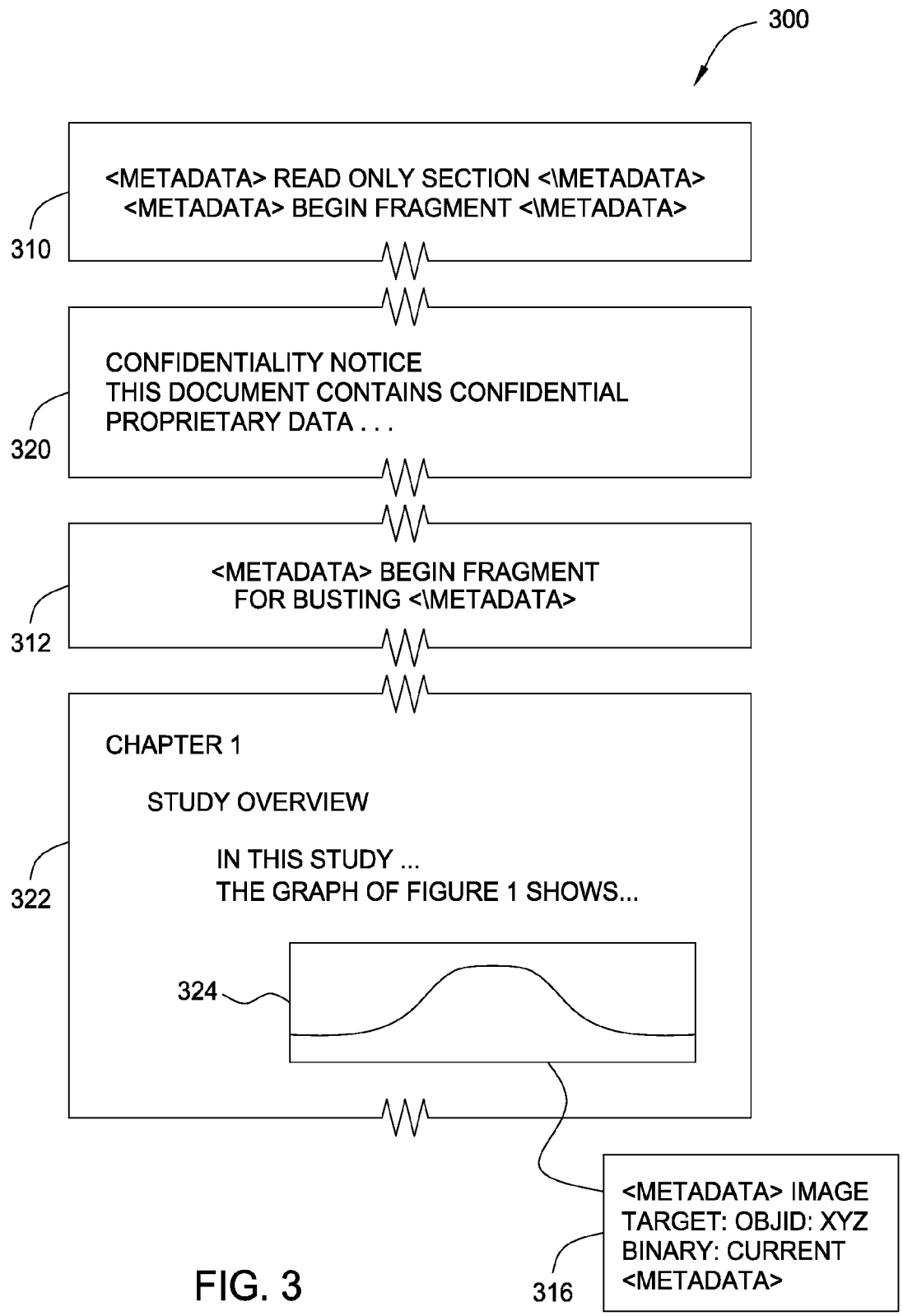
FIG. 3 illustrates an example XML document that includes application specific metadata embedded by a CMS, according to one embodiment of the invention.

FIG. 3 illustrates an example XML document 300 that includes application specific metadata embedded by CMS 130, according to one embodiment of the invention. As shown, XML document 300 includes application specific metadata 310, 312, and 316 describing aspects of content portions 320, 322 and 324. In this example, document 300 represents an introductory portion of the results of a research study. Content portion 320 includes a confidentiality notice. The application specific metadata 310 for this portion of content indicates that section 320 should be treated as read only and that section 320 may be stored as an individual document fragment by CMS 130. Storing portion 322 as its own fragment allows a standard confidentiality notice to be re-used in multiple portions of document 300, as well as re-used in multiple documents.

Content portion 322 shows the first page of a chapter titled "Introduction." Illustratively, the introduction includes a FIG. 324. Application specific metadata 312 indicates that the chapter 1 portion 322 of XML document 300 may be stored as an individual document fragment by CMS 130. Additionally, application specific metadata 316 specifies an image target specifying an object ID value and a binding value used by CMS 130. More specifically, application specific metadata 316 specifies an association between an object in the CMS with a particular element or attribute from the XML document. For example, an XHTML document might contain <img> tags which reference JPG images. When the XML document is imported into the repository, the CMS can automatically process all of the <img> tags in the document and bind them to images stored in the repository. Of course, the application specific metadata used for a particular document in a given case may be tailored to suit the needs of a particular user, client application, or CMS. Thus, application specific metadata may be used to enable or enhance a variety of functions or features provided by client application 108 and CMS 130.

Figure 4:
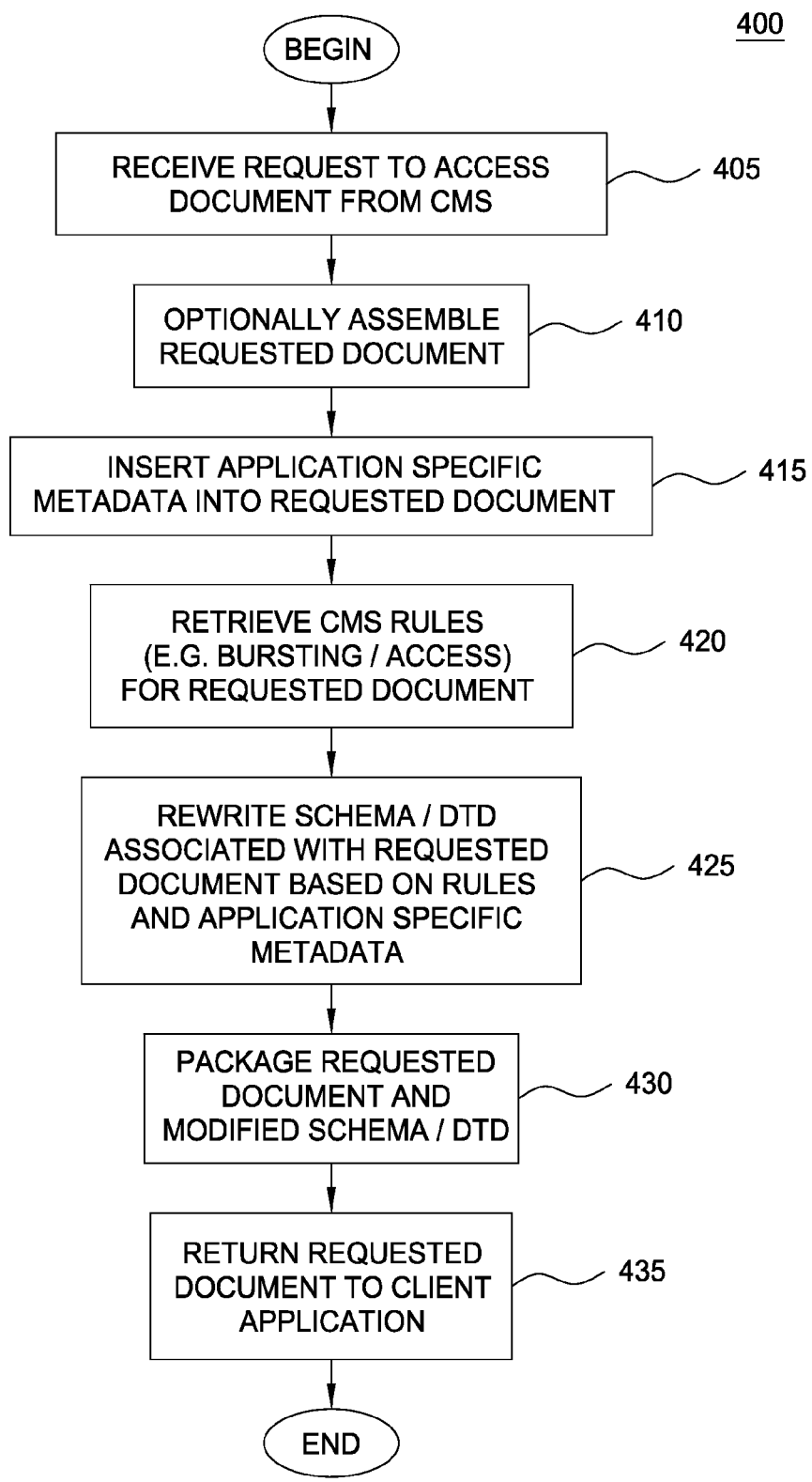
FIG. 4 illustrates a method for a CMS to process a request to access a data object managed by the CMS, according to one embodiment of the invention.

FIG. 4 illustrates a method 400 for a CMS to process a request to access a data object managed by the CMS, according to one embodiment of the invention. The method 400 begins at step 405 where a CMS receives a request to access a data object (e.g., an XML document) from the CMS data repository. For example, users interacting with client application 108 may request to check out a document from the CMS, to view a document in the CMS or to export a document from the CMS. If the requested document is stored by CMS as a collection of fragments or chunks, then at step 410, the components of a compound document may be assembled. For example, the document 300 illustrated in FIG. 3 included a fragment for a confidentiality notice and a fragment for a first chapter (and presumably, subsequent chapters as well). When accessed, all of the individual fragments may be combined to form the complete document.

At step 415, the CMS 130 may be configured to insert application specific metadata into the requested document. For example, if the requested document has been burst into fragments or has links to images (like document 300 of FIG. 3) the CMS can insert metadata into elements to indicate fragment boundaries or whether the user has write permission for each chunk or associated image (like metadata 310, 312, and 316).

At step 420, the CMS 130 may retrieve the application specific metadata rules associated with the requested document. At step 425, using these rules, the CMS 130 may determine which elements from the base DTD or schema associated with the requested document are affected by the extra metadata. In other words, the CMS 130 may identify how the additional elements may cause the requested document to fail a validation against its associated XML schema or DTD. The CMS 130 may use this information to create a transient copy of the DTD/schema and insert definitions for the application-specific metadata.

At step 430 CMS 130 may package the requested document and modified schema and at step 435, the package containing the document and transient schema may be returned to the requesting client application.

Figure 5:
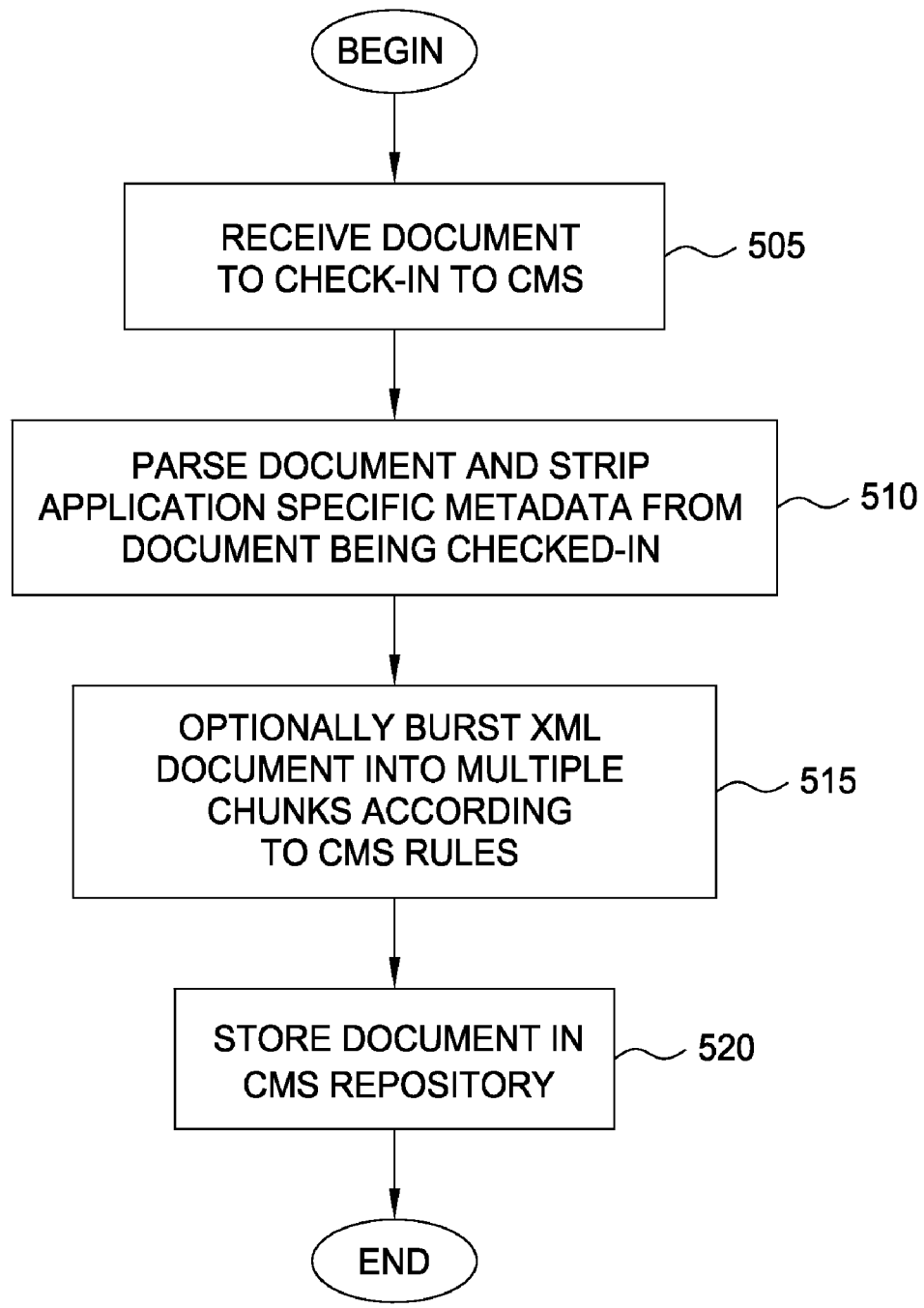
FIG. 5 illustrates a method for checking in a data object managed by a CMS, according to one embodiment of the invention.

FIG. 5 illustrates a method 500 for checking in a data object that has been modified to include application specific metadata, according to one embodiment of the invention. The method 500 begins at step 505 where the CMS receives the XML document to check-in to the CMS. At step 510, the document is parsed and any application specific metadata is stripped from the document. Optionally, at step 515, if the application specific metadata specified to burst the document according to bursting rules, then the document may be burst into the individual chunks. Of course, the application metadata may specify other functions or actions to be performed when the document is checked in, and accordingly, if so, the CMS may perform other actions. At step 520, after any check-in processing is completed, the document is stored in the CMS repository (e.g., file system 142 of storage 124).

Advantageously, by dynamically rewriting the schema or DTD associated with a given document, the CMS can store and manage data objects without disrupting existing XML grammars. Further, the additional metadata may allow the CMS or client application to provide a variety of additional features or functions for creating, editing, and managing a collection of documents.

While the foregoing is directed to embodiments of the present invention, other and further embodiments of the invention may be devised without departing from the basic scope thereof, and the scope thereof is determined by the claims that follow.

What is claimed is:

1. A computer-implemented method for providing dynamic schema assembly to accommodate application specific metadata in data objects managed by a content management system (CMS), comprising:
   receiving a request to access a document from the CMS, wherein the document is associated with a base storage schema, wherein content of the document is composed according to the base storage schema, wherein the base storage schema specifies a valid set of markup language tags and markup language attributes for use in the document;
   modifying an instance of the document by embedding the application specific metadata in the document, wherein the application specific metadata includes at least one of a markup language tag and a markup language attribute that is not valid according to the base storage schema;
   modifying the base storage schema associated with the document to accommodate the application specific metadata by adding the at least one markup language tag and markup language attribute from the application specific metadata to the base storage schema, thereby creating a transient schema, wherein the modified instance of the document is valid according to the transient schema;
   providing the modified instance of the document and the transient schema separately to a requesting application in response to the request;
   receiving the modified instance of the document back from the requesting application;
   stripping the application specific metadata from the modified instance of the document, wherein the modified, stripped instance of the document received back from the requesting application is valid according to the base storage schema; and
   storing the modified, stripped instance of the document in the CMS.

2. The computer-implemented method of claim 1, wherein the CMS stores the document as one or more individual document fragments, and wherein generating the modified instance of the document further comprises assembling the one or more document fragments, and wherein the application specific metadata specifies boundaries between the one or more fragments.

3. The computer-implemented method of claim 1, wherein the application specific metadata specifies read/write rules for portions of the modified instance of the document enforced by the client application.

4. The computer-implemented method of claim 1, wherein rewriting the base storage schema comprises adding elements to the schema describing the application specific metadata.

5. The computer-implemented method of claim 1, wherein the document is an XML document, and wherein the base storage schema is an XML schema.

6. The computer-implemented method of claim 1, wherein storing the modified, stripped instance of the document in the CMS comprises bursting the modified instance of the document received back from the client application, into one or more document fragments according to the application specific metadata, and storing each fragment in the CMS.

7. A computer-readable storage medium containing a program which, when executed, performs an operation for providing dynamic schema assembly to accommodate application specific metadata in data objects managed by a content management system (CMS), the operation comprising:
   receiving a request to access a document from the CMS, wherein the document is associated with a base storage schema, wherein content of the document is composed according to a the base storage schema, and wherein the base storage schema specifies a valid set of markup language tags and markup language attributes for use in the document;
   modifying an instance of the document by embedding the application specific metadata in the document, wherein the application specific metadata includes at least one of a markup language tag and a markup language attribute that is not valid according to the base storage schema;
   modifying the base storage schema associated with the document to accommodate the application specific metadata by adding the at least one markup language tag and markup language attribute from the application specific metadata to the base storage schema, thereby creating a transient schema, wherein the modified instance of the document is valid according to the transient schema;
   providing the modified instance of the document and the transient schema separately to a requesting application in response to the request;
   receiving the modified instance of the document back from the requesting application;
   stripping the application specific metadata from the modified instance of the document, wherein the modified, stripped instance of the document received back from the requesting application is valid according to the base storage schema; and
   storing the modified, stripped instance of the instance of the document in the CMS.

8. The computer-readable storage medium of claim 7, wherein the CMS stores the document as one or more individual document fragments, and wherein generating the modified instance of the document further comprises assembling the one or more document fragments, and wherein the application specific metadata specifies boundaries between the one or more fragments.

9. The computer-readable storage medium of claim 7, wherein the application specific metadata specifies read/write rules for portions of the modified instance of the document enforced by the client application.

10. The computer-readable storage medium of claim 7, wherein rewriting the base storage schema comprises adding elements to the schema describing the application specific metadata.

11. The computer-readable storage medium of claim 7, wherein the document is an XML document, and wherein the base storage schema is an XML schema.

12. The computer-readable storage medium of claim 7, wherein storing the modified, stripped instance of the document in the CMS comprises bursting the modified instance of the document received back from the client application into one or more document fragments according to the application specific metadata, and storing each fragment in the CMS.

13. A system, comprising:
a processor; and
a memory containing a content management system (CMS) configured to perform a method for providing dynamic schema assembly to accommodate application specific metadata in data objects managed by a content management system (CMS), comprising:
  receiving a request to access a document from the CMS, wherein the document is associated with a base storage schema, wherein content of the document is composed according to the base storage schema, and wherein the base storage schema specifies a valid set of markup language tags and markup language attributes for use in the document,
  modifying an instance of the document by embedding the application specific metadata in the document, wherein the application specific metadata includes at least one of a markup language tag and a markup language attribute that is not valid according to the base storage schema;
  modifying the base storage schema associated with the document to accommodate the application specific metadata by adding the at least one markup language tag and markup language attribute from the application specific metadata to the base storage schema, thereby creating a transient schema, wherein the modified instance of the document is valid according to the transient schema,
  providing the modified instance of the document and the transient schema separately to a requesting application in response to the request,
  receiving the modified instance of the document back from the requesting application,
  stripping the application specific metadata from the modified instance of the document, wherein the modified, stripped instance of the document received back from the requesting application is valid according to the base storage schema, and
  storing the modified, stripped document in the CMS.

14. The system of claim 13, wherein the CMS stores the document as one or more individual document fragments, and wherein generating the modified instance of the document further comprises assembling the one or more document fragments, and wherein the application specific metadata specifies boundaries between the one or more fragments.

15. The system of claim 13, wherein the application specific metadata specifies read/write rules for portions of the modified instance of the document enforced by the client application.

16. The system of claim 13, wherein rewriting the base storage schema comprises adding elements to the schema describing the application specific metadata.

17. The system of claim 13, wherein the document is an XML document, and wherein the base storage schema is an XML schema.

18. The system of claim 13, wherein storing the modified, stripped instance of the document in the CMS comprises bursting the modified instance of the document received back from the client application into one or more document fragments according to the application specific metadata, and storing each fragment in the CMS.

19. The computer-implemented method of claim 1:
wherein the markup language tags are chosen from the group consisting of html tags and XML tags; and
wherein the markup language attributes are chosen from the group consisting of html attributes and XML attributes.

* * * * *